March 15, 1949.                    D. B. KEIM                    2,464,582
                              TRIMMER CAPACITOR
                            Filed March 30, 1948
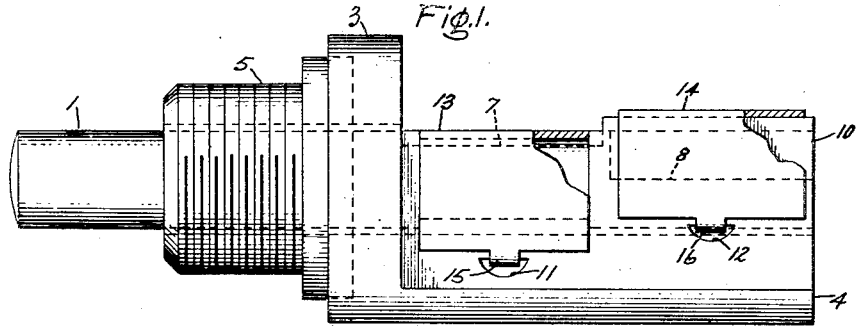
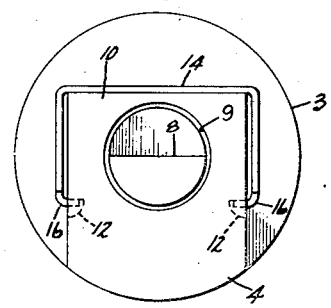
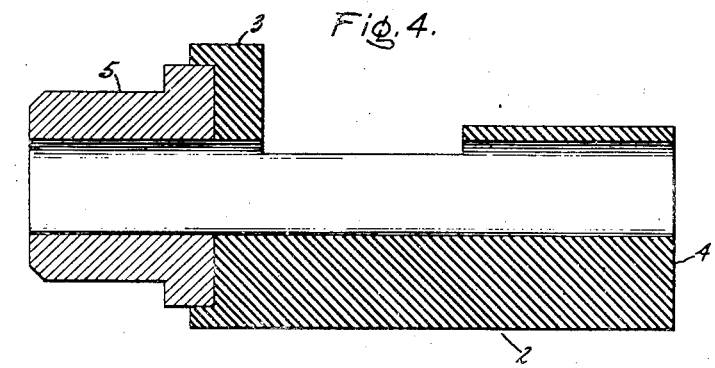
Inventor:
Donald B. Keim,
by *Morton D. Massé*
His Attorney.

Patented Mar. 15, 1949

2,464,582

UNITED STATES PATENT OFFICE 2,464,582

TRIMMER CAPACITOR

Donald B. Keim, Bridgeport, Conn., assignor to General Electric Company, a corporation of New York Application March 30, 1948, Serial No. 17,905

3 Claims. (Cl. 175—41.5)

1

This invention relates to electrical capacitors of the variable type, and more particularly to trimmer capacitors useful for obtaining extremely small capacity variations.

It is an object of this invention to provide a trimmer capacitor that is rugged and inexpensive to construct.

A further object of this invention is to provide a trimmer capacitor having a low minimum capacity of substantially one micro-microfarad, and of such construction as to make possible the use of relatively short leads for connecting the capacitor into a utilization circuit.

It is proposed, in accordance with the present invention, to provide such a trimmer capacitor wherein the rotation of a shaft having a flat shaped portion is utilized to secure a capacity variation of the order of one micro-microfarad.

The features of this invention which are believed to be new are set forth with particularity in the appended claims. The invention itself, however, together with further objects and advantages thereof may best be understood by reference to the following description, when taken in conjunction with the accompanying drawing, in which Fig. 1 shows one embodiment of the proposed trimmer capacitor, Fig. 2 shows an end view thereof, Fig. 3 shows a shaft which forms the rotor of the capacitor, and Fig. 4 is a sectional view of the body portion of the proposed assembly.

Referring now to Fig. 1, the capacitor assembly comprises essentially a shaft 1 rotatably mounted in an insulating body 2. Body 2 may be formed of molded polystyrene and includes a disc-like section 3 formed integral with a further section 4. The body 2 may be mounted on a suitable panel or bracket by means of a bushing 5, which is sealed, or molded as an insert, into section 3 of body 2, as shown.

The shaft 1, as shown in Fig. 3, comprises a portion of reduced diameter 7 and a flat portion 8. Section 4 of body 2 is so formed that the portion 7 of shaft 1 is partially exposed, and electrical connection may thereby be made to shaft 1 by means of a clip 13 shown in Fig. 1. The flat portion 8 of shaft 1 extends into an aperture 9, this aperture being a continuation of the shaft hole and formed in section 4 of body 2. The end portion 10 of section 4 acts as a dielectric between the round surface of the flat portion 8 of shaft 1 and a clip 14 which forms the stator of the capacitor. Section 4 has two grooves 11 and 12 formed on each side thereof, these grooves acting as a securing means for clips 13 and 14.

2

Clip 13 is mounted on section 4 of body 2 and held in place by lugs 15 coacting with grooves 11. Clip 13 constitutes a brush which makes electrical connection with portion 7 of shaft 1 and hence to the portion 8 of this shaft which forms the rotor section of the capacitor. Clip 14 is similarly mounted on section 4 and covers the dielectric portion 10 of this section, clip 14 being held in place by lugs 16 coacting with grooves 12. As previously mentioned, clip 14 forms the stator plate of the capacitor, the capacitance between this plate and the portion 8 of shaft 1 being varied by rotating the shaft. Shaft 1 is held in body 2 by means of the clip 13 coacting with shaft 1 at the reduced portion 7, this clip also serving as a terminal connected to the rotor of the capacitor. The external leads to the capacitor may take the form of short strips (not shown) which may be spot-welded to clips 13 and 14.

Fig. 2, an end view of the assembly, illustrates the manner in which clip 14 is mounted to cover dielectric portion 10 of section 4, this clip being secured by lugs 16 coacting with grooves 12. The flat portion 8 of shaft 1 is also shown herein, this portion extending into aperture 9 of section 4.

Fig. 4 shows a sectional view of the body 2, the body comprising integral sections 3 and 4 and being composed of insulating material, preferably molded polystyrene. As previously described, bushing 5 is sealed into the body 2 and provides a mounting means for the capacitor assembly, as well as a bearing for shaft 1.

My construction, therefore, provides a rugged trimmer capacitor assembly, simple and inexpensive to construct and capable of small capacity variations, the assembly being so formed that extremely short leads may be used as electrical connections thereto. While the body 2 has been described as formed of polystyrene, any suitable thermoplastic material which insures a low loss factor and good temperature stability may be used.

While a certain perferred embodiment has been shown and described, it will, of course, be understood that various modifications may be made without departing from the invention. The appended claims are, therefore, intended to cover any such modifications as fall within the true spirit and scope of the invention.

What I claim as new and desire to secure by Letters Patent of the United States is:

1. An electrical capacitor assembly comprising a body composed of insulating material, and a shaft member rotatably mounted in said body, said body portion having an opening therein exposing a portion of said shaft member, and said shaft member having a substantially flat portion formed therein, a first clip member mounted on said body and coacting with the exposed portion of said shaft member, a second clip member mounted on said body and having a surface thereof separated from said flat portion by a portion of said body, said flat portion and said second clip forming a capacitance, and said first and second clip members forming terminals therefor.

2. An electrical capacitor assembly comprising a body composed of molded insulating material, and a shaft member rotatably mounted in said body, said shaft member including a reduced diameter portion and a substantially flat portion, said body having an opening therein exposing said reduced diameter portion, a first clip member mounted on said body and coacting with said exposed reduced diameter portion to limit longitudinal movement between said body and said shaft, said clip member forming an electrical connecting means for said shaft member, a second clip member mounted on said body and having a surface thereof separated from the flat portion of said shaft member by a portion of said body, said flat portion surface and said second clip member forming a capacitance, and said clip member providing terminals for said capacitance.

3. An electrical capacitor assembly comprising a body composed of molded insulating material, a mounting bushing sealed in said material, and a shaft member rotatably mounted in said body, said shaft member including a reduced diameter portion and a substantially flat portion, said body having an opening therein exposing said reduced diameter portion, a first clip member mounted on said body and coacting with the exposed reduced diameter portion of said shaft member to limit longitudinal movement between said body and said shaft, a second clip member mounted on said body and having a surface thereof separated from the flat portion of said shaft member by a portion of said body, said last-mentioned portion forming a dielectric between said surface and said flat portion, and said assembly having electrical connections made to said first and second clip members.

DONALD B. KEIM.

No references cited.